(No Model.)
A. H. BARNES.
COMBINED TRUCK AND STEP LADDER.
No. 298,336. Patented May 13, 1884.
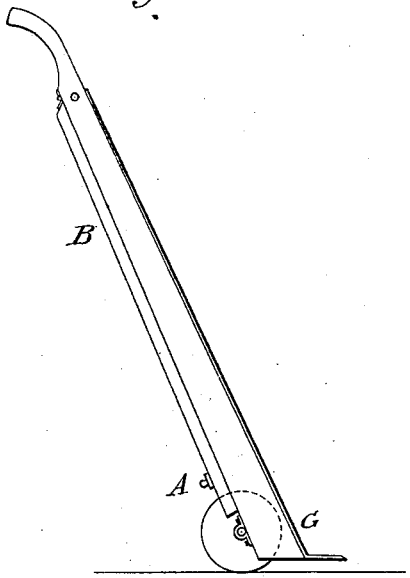
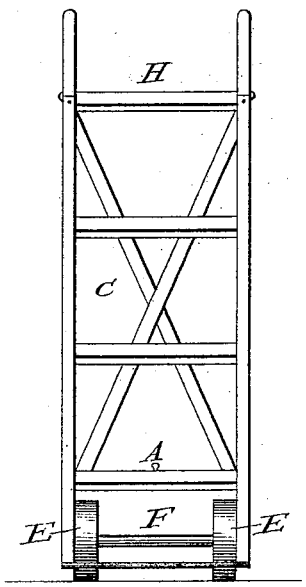
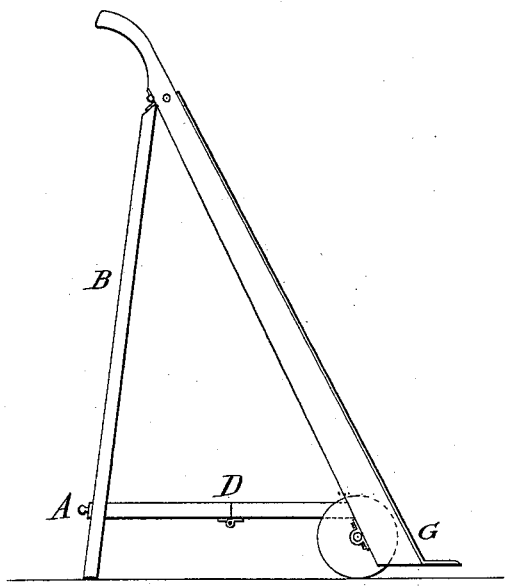

UNITED STATES PATENT OFFICE.

AMOS HUTCHINGSON BARNES, OF RENO, NEVADA.

COMBINED TRUCK AND STEP-LADDER.

SPECIFICATION forming part of Letters Patent No. 298,336, dated May 13, 1884.

Application filed November 7, 1883. (No model.)

*To all whom it may concern:*

Be it known that I, A. H. BARNES, a citizen of the United States, and a resident of Reno, county of Washoe, State of Nevada, have invented certain new and useful Improvements in Warehouse-Trucks, said improvements consisting of step-ladders attached to said ware-house trucks, and is so constructed that it may be used either as a warehouse-truck or a step-ladder, thereby combining both in one and avoiding the trouble of having both separate.

Figure 1 is a view of my invention, with the standards that constitute a part of the step-ladder closed and secured in place, with catch A upon the lower step, thus forming an ordinary truck. Fig. 2 is a side view when in position as a step-ladder. Fig. 3 is a front view, showing the steps gained in between the two main arms.

B is the standard, dropped down as used for a step-ladder.

C is a cross-brace between standards B B. The standards B B are hung with hinges at the top, and held in position or place, when spread, by jointed bar D, said bar having three (3) hinges—viz., one (1) in the center and one (1) at each end, so as to double up when used for a truck.

E E are the wheels, which are between the main arms, so that the standards will close up against the main arms and present a neat appearance.

The truck may be made of any size or strength.

Having fully described my invention, what I claim as new, and desire to secure by Letters Patent, is—

An improvement in trucks, with the necessary attachment to form a step-ladder, with steps H between the main arms of the truck, with standards B B hung to the handles of the truck, and with the necessary braces C, with jointed bar D attached to the standards at one end and to the lower step at the other, thus forming a steady support for the step-ladder.

In testimony that I claim the foregoing I have hereunto set my hand.

A. H. BARNES.

Witnesses:
 D. R. O'KEEFFE,
 J. H. CORLISS.